United States Patent [19]

Naples et al.

[11] Patent Number: 4,910,918
[45] Date of Patent: Mar. 27, 1990

[54] CORNER STRUCTURE FOR GLASS RUN CHANNEL

[75] Inventors: Dale A. Naples, Goldsboro, N.C.; Robert A. Vaughan, Dearborn, Mich.

[73] Assignee: The Standard Products Company, Cleveland, Ohio

[21] Appl. No.: 183,614

[22] Filed: Apr. 19, 1988

[51] Int. Cl.⁴ .............................................. E06B 7/23
[52] U.S. Cl. ...................................... 49/441; 49/479; 49/490
[58] Field of Search ................. 49/479, 441, 490, 491; 160/381

[56] References Cited

U.S. PATENT DOCUMENTS

| | | | |
|---|---|---|---|
| 2,101,349 | 12/1937 | Sharp | 160/381 |
| 3,219,100 | 11/1965 | Johnston et al. | 160/381 X |
| 3,709,533 | 1/1973 | Walters | 160/381 X |
| 4,010,573 | 3/1977 | Andrzejewski | 49/479 |
| 4,055,910 | 11/1977 | Schmidt | 160/381 X |
| 4,444,525 | 4/1984 | Alander | 160/381 X |
| 4,614,061 | 9/1986 | Brocke | 49/490 X |
| 4,783,931 | 11/1988 | Kirkwood | 49/441 |

FOREIGN PATENT DOCUMENTS 2628767 12/1977 Fed. Rep. of Germany ...... 160/381

*Primary Examiner*—James R. Brittain
*Attorney, Agent, or Firm*—Harness, Dickey & Pierce

[57] ABSTRACT

An insert for securing together two strips of a vehicle glass run channel, having a reinforcement member, at a corner is disclosed. The insert includes an elongated frame member. A tab mechanism projects from the frame member. The tab mechanism is associated with the reinforcement members of the glass run channel strips for securing the two strips together at the corner.

3 Claims, 2 Drawing Sheets

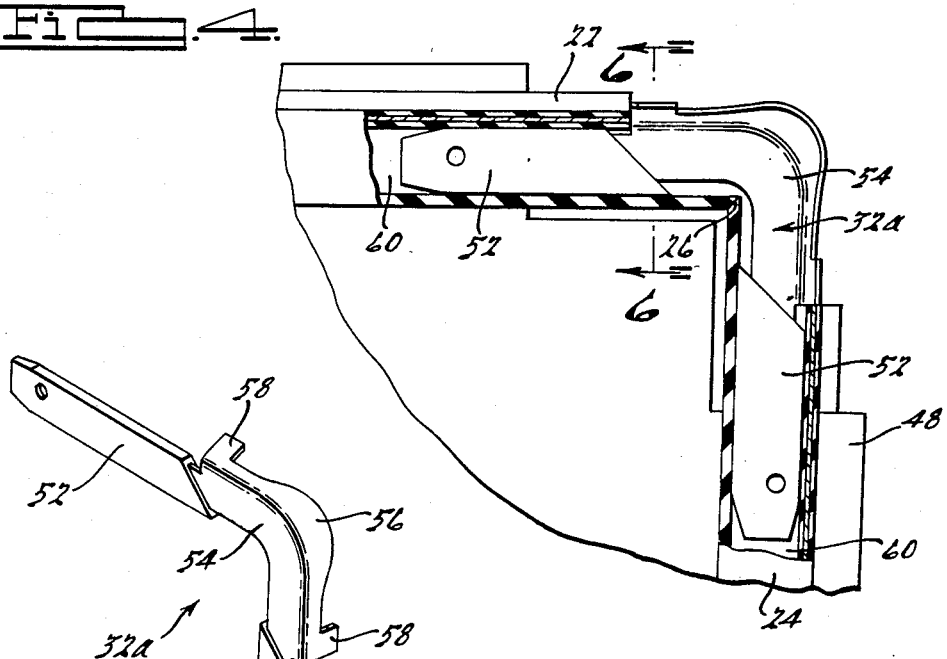
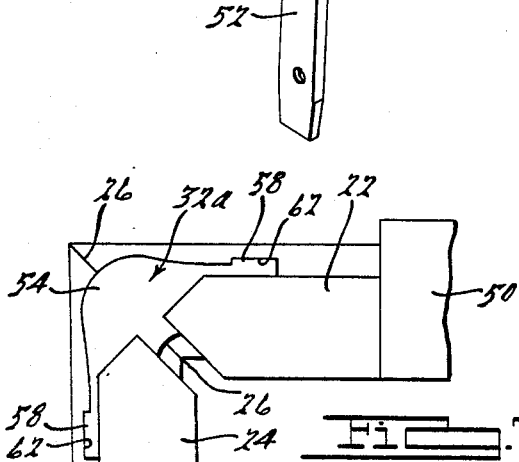
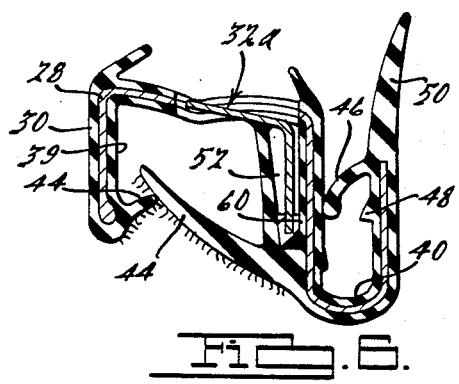
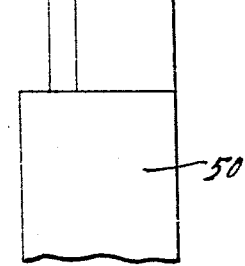
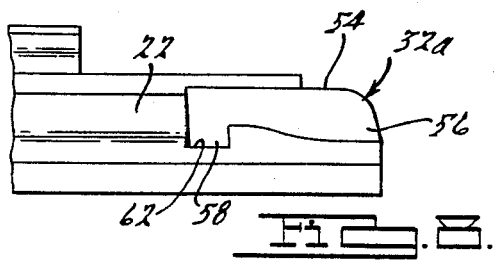

CORNER STRUCTURE FOR GLASS RUN CHANNEL

BACKGROUND AND SUMMARY OF THE INVENTION

The present invention relates to glass run channels for motor vehicles and more particularly to a corner structure having an insert reinforcement.

Glass run channels are used in motor vehicles to support the movable side windows for sliding up and down movement and to form a seal around the window to protect the passenger compartment from the elements. There are a number of different glass run channel designs in use today. Ideally a glass run channel should be sturdy, capable of supporting the movable window firmly without undue resistance to raising and lowering, watertight and free from gaps which can whistle in strong winds or when the vehicle is moving. In addition, the glass run channel should be aesthetically pleasing and should be capable of being installed along the vehicle door header and pillar in an unobtrusive and aerodynamic fashion. Prior art glass run channels have been generally deficient in one or more of the above regards.

Accordingly, the present invention provides a glass run channel for supporting a movable pane of glass in a vehicle door or side portion. The glass run channel comprises metal reinforced rubber or plastic channel members or which are joined in a mitered corner at the intersection of the vehicle door header and vertical leg such as A, B, or C pillar. The channel members are secured together and reinforced by a generally L-shaped reinforcement bracket or corner insert. The reinforcement bracket slidably fits within internal channels formed in each of the adjoining channel members. The reinforcement bracket has outstruck tangs which interlock in recessed keys formed or molded into each of the channel members adjacent the mitered corner. Elongated covers such as those made from plastic may be molded onto or otherwise applied to the respective legs of the L-shaped reinforcement bracket to provide a good frictional fit between the reinforcement bracket and the internal channels of the channel members into which the bracket is inserted. At the intersection of the two legs which define the L-shaped reinforcement bracket, a rounded concave surface is formed. When the reinforcement bracket is installed, the concave surface is curved toward the mitered corner and forms a protective corner guard. The concave shape also strengthens the reinforcement bracket against bending and torsional loads.

For a more complete understanding of the invention, its object and advantages, reference may be had to the following specification and to the accompanying drawings.

BRIEF DESCRIPTION OF THE DRAWINGS

FIG. 4 is an enlarged partial cross-sectional view of another embodiment of the invention.

FIG. 5 is a perspective view of the reinforcement bracket of the embodiment of FIG. 4.

FIG. 6 is a cross-sectional view of the embodiment of FIG. 4 taken along the line 6—6 in FIG. 4.

FIG. 7 is an elevational view of the corner structure of FIG. 4 viewing the side which faces interiorly into the passenger compartment.

FIG. 8 is an elevational view of the corner structure of FIG. 4.

DESCRIPTION OF THE PREFERRED EMBODIMENTS

Figure 1:
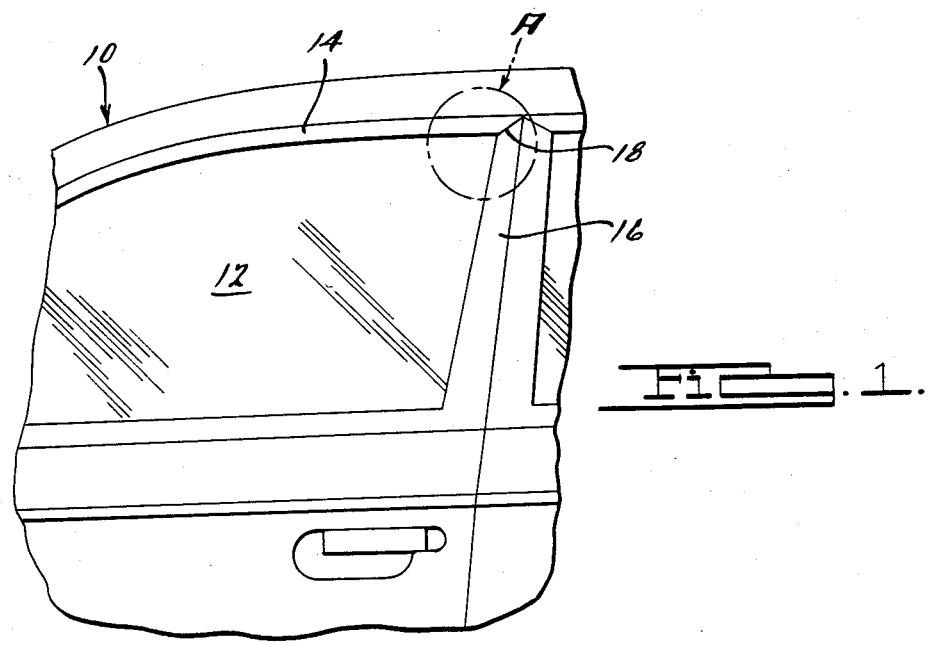
FIG. 1 is a partial elevational view of a vehicle showing the general location of a glass run channel corner structure.
Figure 2:
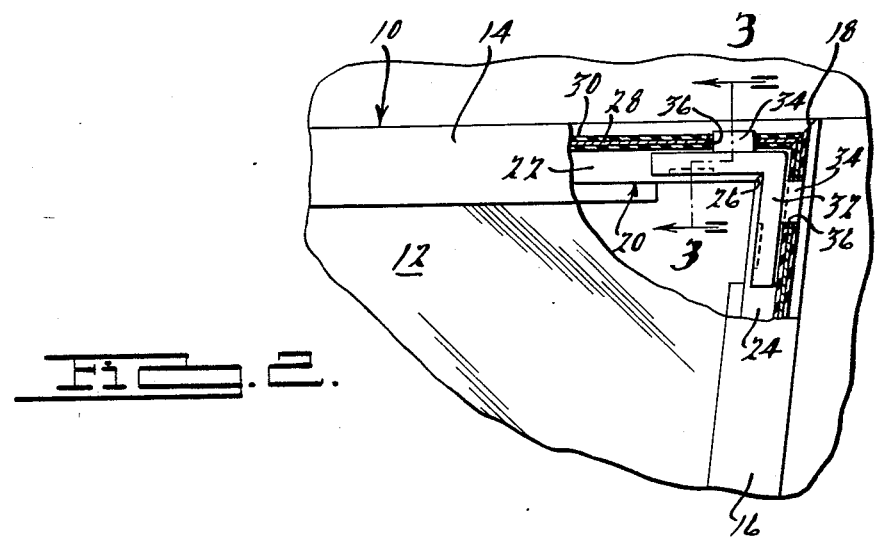
FIG. 2 is an enlarged partial cross-section elevational view of the corner of FIG. 1.

Referring to FIG. 1, the driver's side door assembly, generally indicated at 10, of a vehicle includes a movable glass window 12, door header 14 and vertical leg such as A, B, or C pillar 16. The door header 14 and B pillar 16 meet in a mitered corner 18 generally in the vicinity designated A. Referring to FIG. 2, the region designated generally as A in FIG. 1 is shown in greater detail to reveal a glass run channel, generally indicated at 20, located within the door header 14 and B pillar 16 in which the movable glass window 12 slides. Glass run channel 20 comprises a header channel member 22 which is attached to the vehicle door header 14. Glass run channel 20 also includes a pillar channel member 24 which is attached to the vehicle door pillar 16. Channel members 22 and 24 meet to define a second mitered corner 26. Channel members 22 and 24 each comprise a metal channel forming section 28 which is clad with a covering 30 of rubber or plastic.

The corner structure of the embodiment depicted in FIG. 2 further comprises a reinforcement bracket 32 which strengthens and reinforces the mitered corner 26 and connects the channel members 22 and 24 together. Reinforcment bracket 32 is formed with a pair of tangs 34 which project through apertures 36 in the channel members 22, 24. The tangs 34 are bent or turned down flush against the channel members 22 and 24.

Figure 3:
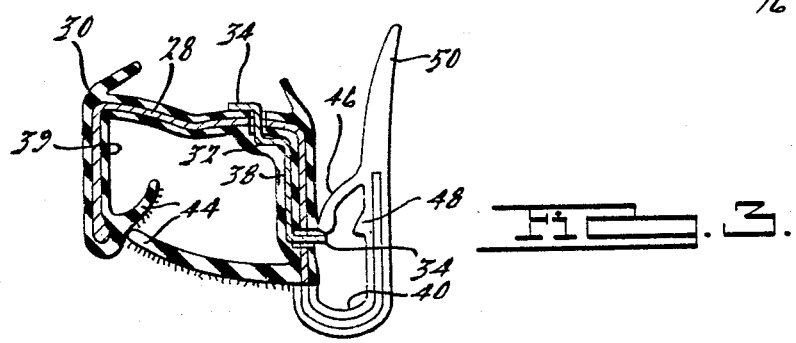
FIG. 3 is a cross-sectional view taken along the line 3—3 of FIG. 2.

FIG. 3 illustrates the corner structure configuration of FIG. 2 in greater detail. As seen in FIG. 3, the reinforcement bracket 32 is generally L-shaped in cross section (as at 38) with tangs 34 extending outwardly at right angles to the L-shaped cross section. The channel member, which is comprised of metal channel forming section 28 and covering 30 defines a large inwardly directed channel 39 and a small outwardly directed channel 40. The large channel 39 is adapted to receive the window pane 12 while the small channel 40 is adapted to fit onto a flange structure formed on the vehicle door frame. As illustrated, the rubber covering 30 is formed with a first pair of protrusions or lips 44 which are molded to assume a naturally closed or contacting position (shown) when the glass pane is not present in the large channel 38. The lips 44 readily separate when the glass pane 12 is inserted into the channel 20 and at the same time embraces the glass pane 12 to effect a seal and to help hold the pane 12 in proper position. In a similar fashion, the covering 30 around small channel 40 forms a lip 46 and protruberance 48 which assist in attaching the channel member 20 to the flanged door frame structure and at the same time form a seal. The rubber covering 30 extends beyond the end of the metal channel forming section 28, as at 50. This extending portion may be tucked under the sealing covering material or a molding strip to provide a finished appearance and a good weather-tight seal.

Another embodiment of the invention is illustrated in FIGS. 4-8. Like parts of the preferred embodiment have like numerals. In the embodiment of FIGS. 4–8 the reinforcement bracket 32a has a somewhat different configuration shown in FIG. 5. As illustrated in FIG. 5, reinforcement bracket 32a is generally L-shaped. The reinforcement bracket 32a comprises a metal bracket structure onto which two plastic inserts 52 have been molded or otherwise affixed. The plastic inserts 52 have a beveled edge portion on either the top or bottom edge thereof. The legs of bracket 32a onto which inserts 52 have been molded are substantially flat and lie in a common plane. The midsection 54 of bracket 32a includes a rounded concave portion 56 which may be formed by stamping. At opposite extremes of concave portion 56 are a pair of outstruck tangs 58. Thus the midsection 54 is generally L-shaped in cross section, with the concave portion extending away from the plane in which the legs of bracket 32a lie.

Referring to FIGS. 4 and 7, reinforcement bracket 32a is positioned at the mitered corner 26 where header channel member 22 and pillar channel member 24 meet. The plastic encapsulated ends or inserts 52 fit snugly within a channel or sleeve 60 formed in the respective channel members 22, 24. Sleeve 60 has a complementary beveled portion similar to the beveled portion of the insert 52. Sleeve 60 (which is substantially filled by insert 52) is also indicated in FIG. 6. With specific reference to FIG. 6, many of the details of the channel member cross section are the same as described in connection with FIG. 3 above and will not be repeated here. FIG. 6 does illustrate the generally L-shaped cross-sectional configuration of the midsection 54 of reinforcement bracket 32a.

As perhaps best seeen in FIGS. 7 and 8, the tangs 58 of reinforcement bracket 32a fit within corresponding keys 62 formed in the respective channel members 22, 24. When assembled, these tangs 58 and keys 60 interlock to help prevent the channel members 22, 24 from separating or becoming detached from the reinforcement bracket 32a. Frictional forces between the sidewalls of the rubber sleeve 60 and the exterior surfaces of nylon inserts 52 also prevent the channel members 22, 24 from becoming separated from the reinforcement bracket 32a. The concave portion 56 of reinforcement bracket 32a extends toward the mitered corner 26, covering and protecting it. In FIG. 7 the rubber extension portion 50 of the channel members 22, 24 has been shown cut back to reveal the corner structure better. If desired, these extension portions 50 may be continued up to the location of the mitered corner 26 and themselves mitered to form a neat and finished appearance.

The resulting corner structure is easy to assemble and yet quite strong. The L-shaped cross section of the midsection 54 and the concave portion 56 add strength to inhibit bending and torsional deflection of the channel members 22, 24. The result is a neat and trim corner treatment which holds the glass run channels 20 of the respective channel members 22, 24 in accurate alignment for easy window operation. The corner, so configured, will not readily separate at the mitered junction, due to the interlocking key 62 and tang 58 configuration and due to the frictional forces between the nylon inserts 52 and rubber sleeve 60.

While the invention has been described in connection with the presently preferred embodiments, it will be understood that the invention is capable of certain modification and change without departing from the spirit of the invention as set forth in the appended claims.

What is claimed is:

1. A glass run channel for a vehicle door frame comprising:

a pair of elongated reinforcement members, together said pair having a shape corresponding substantially to the sealable boundary of a window, each of said elongated reinforcement members having a combined L-shaped/U-shaped cross-section portion where the L-shaped cross-section portion extends from a leg of the U-shaped cross-section portion;

window sealing means positioned in the interior surface of said Lshaped cross-section portion of said elongated reinforcement members;

means positioned in the interior of the U-shaped cross-section portion of said elongated reinforced members for securing said glass run channel to a flange of a door;

insert means for securing said pair of elongated reinforcement members to one another, said insert comprising:

a frame member having a pair of substantially flat, planar legs angled at a desired angle with respect to one another presenting an overall L-shape for forming a desired corner angle between said pair of elongated reinforcement members; and tang means projecting from said legs of said frame member, said tang means comprising two pairs of tangs, one tang of each pair projecting from each of said legs in a direction transverse to said frame legs and the other tang of each pair projecting from each of said legs in a different direction than said first tang, said tangs associated with said elongated reinforcement members such that one tang of each of said pairs is adapted to associate with a leg of the U-shaped cross-section portion of the elongated reinforcement members and the other tang of each of said pairs is adapted to associate with a leg of the L-shaped cross-section portion extending from the U-shaped cross-section portion of the elongated reinforcement members, the leg of the L-shaped cross-section portion being transverse to the leg of the U-shaped cross-section portion of the elongated reinforcement members, said tangs for securing said elongated reinforcement members together to form a corner between said elongated reinforcement members.

2. The glass run channel according to claim 1 wherein a flange member depending from a longitudinal edge of said legs such that said flange is continuous with said edge of said legs.

3. The glass run channel according to claim 2 wherein one tang of each of said pairs project from said flange member.

* * * * *